(12) United States Patent
Chong et al.

(10) Patent No.: US 7,441,113 B2
(45) Date of Patent: Oct. 21, 2008

(54) METHOD AND APPARATUS FOR VIRTUALIZATION OF APPLIANCES

(75) Inventors: Benedict T. Chong, San Jose, CA (US);
Mark M. Lee, Saratoga, CA (US);
Philip Sheu, Lake Oswego, OR (US);
Robert P. Ha, Saratoga, CA (US);
Thomas Deng, Cupertino, CA (US);
Victor E. Chin, San Jose, CA (US);
Wenchi Fang, San Jose, CA (US); Xun Fang, Livermore, CA (US); Yuchung Lu, Cupertino, CA (US)

(73) Assignee: DEVICEVM, Inc., San Jose, CA (US)

( * ) Notice: Subject to any disclaimer, the term of this patent is extended or adjusted under 35 U.S.C. 154(b) by 0 days.

(21) Appl. No.: 11/772,700

(22) Filed: Jul. 2, 2007

(65) Prior Publication Data
US 2008/0126785 A1  May 29, 2008

Related U.S. Application Data

(60) Provisional application No. 60/890,121, filed on Feb. 15, 2007, provisional application No. 60/806,915, filed on Jul. 10, 2006.

(51) Int. Cl.
G06F 9/00 (2006.01)
G06F 9/24 (2006.01)
G06F 15/177 (2006.01)
(52) U.S. Cl. .............................. 713/2; 713/1; 713/100
(58) Field of Classification Search ...................... 713/2
See application file for complete search history.

(56) References Cited

U.S. PATENT DOCUMENTS 6,763,458 B1 * 7/2004 Watanabe et al. ........... 713/100
6,765,788 B2   7/2004 Wu
6,948,058 B2   9/2005 Tung
7,010,627 B2   3/2006 Lin (Continued)

FOREIGN PATENT DOCUMENTS

CN           1710537         7/2005

(Continued)

*Primary Examiner*—Rehana Perveen
*Assistant Examiner*—Michael J Brown
(74) *Attorney, Agent, or Firm*—Michael A. Glenn; Glenn Patent Group

(57) ABSTRACT

A method and apparatus for the virtualization of appliances provides an embedded operating system (OS) which is included in the system boot ROM of a personal computer. When the system boots, the OS is launched and looks for all available virtual appliances from, for example, the following places: local USB, flash card, e.g. SD, xD, CF, CDROM/DVD, or other storage media; local hard disk storage; and the Internet, e.g. an appliance server. The user selects an appliance to use from the OS, whereupon the appliance is loaded and launched. If the selected appliance is not on a local storage, then it is downloaded, e.g. over the Internet from an appliance server. The downloaded appliance can be cached in local storage media such that, the next time it is needed, it need not be downloaded from the appliance server. The user can also elect to boot an operating system from the hard disk, if an operating system and hard disk are installed, or to power-off the system.

21 Claims, 11 Drawing Sheets

U.S. PATENT DOCUMENTS

| | | |
|---|---|---|
| 7,076,644 B2 | 7/2006 | Hsu |
| 7,076,646 B2 | 7/2006 | Chang |
| 2004/0225876 A1* | 11/2004 | Lam .............................. 713/2 |
| 2005/0210476 A1 | 9/2005 | Wu |
| 2005/0223307 A1 | 10/2005 | Wu |
| 2005/0246561 A1 | 11/2005 | Wu |
| 2007/0113062 A1* | 5/2007 | Osburn et al. .................. 713/1 |
| 2007/0162736 A1 | 7/2007 | Wu |
| 2007/0214345 A1* | 9/2007 | Fleming ....................... 713/1 |

FOREIGN PATENT DOCUMENTS

| | | |
|---|---|---|
| CN | 1710540 | 7/2005 |
| CN | 1716162 | 7/2005 |

\* cited by examiner

METHOD AND APPARATUS FOR VIRTUALIZATION OF APPLIANCES

CROSS REFERENCE TO RELATED APPLICATIONS

This application claims priority to U.S. provisional patent application Ser. Nos. 60/806,915, filed Jul. 10, 2006 and 60/890,121, filed Feb. 15, 2007, each of which is incorporated herein in its entirety by this reference thereto.

BACKGROUND OF THE INVENTION

1. Technical Field

The invention relates to virtualization. More particularly, the invention relates to a method and apparatus for virtualization of appliances.

2. Description of the Prior Art

In computing, virtualization is a broad term that refers to the abstraction of computer resources. One useful definition is a technique for hiding the physical characteristics of computing resources from the way in which other systems, applications, or end users interact with those resources. This includes making a single physical resource, such as a server, an operating system, an application, or storage device, appear to function as multiple logical resources; or it can include making multiple physical resources, such as storage devices or servers, appear as a single logical resource. See wikipedia.

However, the term is an old one: It has been widely used since the 1960s or earlier, and has been applied to many different aspects and scopes of computing, from entire computer systems to individual capabilities or components. The common theme of all virtualization technologies is the hiding of technical detail, through encapsulation. Virtualization creates an external interface that hides an underlying implementation, e.g. by multiplexing access, by combining resources at different physical locations, or by simplifying a control system. Recent development of new virtualization platforms and technologies has refocused attention on this mature concept.

There are several approaches to platform virtualization, listed below based on how complete a hardware simulation is implemented. The following terms are not universally-recognized as such, but the underlying concepts are all found in the literature.

Emulation or simulation: the virtual machine simulates the complete hardware, allowing an unmodified guest OS for a completely different CPU to be run. This approach has long been used to enable the creation of software for new processors before they were physically available. Examples include Bochs, PearPC, PowerPC version of Virtual PC, QEMU without acceleration, and the Hercules emulator. Emulation is implemented using a variety of techniques, from state machines to the use of dynamic recompilation on a full virtualization platform.

Native virtualization and full virtualization: the virtual machine simulates enough hardware to allow an unmodified guest OS, i.e. one designed for the same CPU, to be run in isolation. Typically, many instances can be run at once. This approach was pioneered in 1966 with CP-40 and CP[-67]/CMS, predecessors of IBM's VM family. Examples include VirtualBox, Virtual Iron, Virtual PC, VMware Workstation, VMware Server (formerly GSX Server), VMware ESX Server, QEMU, Parallels Desktop, Adeos, Mac-on-Linux, Win4BSD, Win4Lin Pro, and z/VM.

Partial virtualization, including address space virtualization: the virtual machine simulates multiple instances of much, but not all, of an underlying hardware environment, particularly address spaces. Such an environment supports resource sharing and process isolation, but does not allow separate guest operating system instances. Although not generally viewed as a virtual machine category per se, this was an important approach historically, and was used in such systems as CTSS, the experimental IBM M44/44X, and arguably such systems as OS/VS1, OS/VS2, and MVS. Many more recent systems, such as Microsoft Windows and Linux, as well as the remaining categories below, also use this basic approach.

Paravirtualization: the virtual machine does not necessarily simulate hardware, but instead or in addition offers a special API that can only be used by modifying the guest OS. This system call to the hypervisor is referred to as a hypercall in Xen, Parallels Workstation, and Enomalism; it is implemented via a DIAG ("diagnose") hardware instruction in IBM's CMS under VM, which was the origin of the term hypervisor. Examples include Win4Lin 9x, Sun's Logical Domains, and z/VM.

Operating system-level virtualization: virtualizing a physical server at the operating system level, enabling multiple isolated and secure virtualized servers to run on a single physical server. The guest OS environments share the same OS as the host system, i.e. the same OS kernel is used to implement the guest environments. Applications running in a given guest environment view it as a stand-alone system. Examples are Linux-VServer, Virtuozzo (for Windows or Linux), OpenVZ, Solaris Containers, and FreeBSD Jails.

Application Virtualization: running a desktop or server application locally, using local resources, within an appropriate virtual machine. This is in contrast with running the application as conventional local software, i.e. software that has been installed on the system. Such a virtualized application runs in a small virtual environment containing the components needed to execute, such as registry entries, files, environment variables, user interface elements, and global objects.

This virtual environment acts as a layer between the application and the operating system, and eliminates application conflicts and application-OS conflicts. Examples include the Sun Java Virtual Machine, Softricity, Thinstall, Altiris, and Trigence.

Given the interest in virtualization, it would be advantageous to provide a method and apparatus for the virtualization of appliances.

SUMMARY OF THE INVENTION

The invention provides a method and apparatus for the virtualization of appliances. In a presently preferred embodiment, an embedded operating system (OS) is included in the system boot ROM of a personal computer. The embedded OS quickly boots up and installs the necessary drivers for network access and potentially graphics display. The boot process takes ~3 seconds to have an instant-on appearance. The embedded OS then immediately accesses the network to retrieve a virtual appliance and execute it, or it may retrieve a virtual appliance from the BIOS ROM or other storage media. Normally, the BIOS ROM virtual appliance is an electronic programming guide (EPG). The EPG is similar to those provided with a set-top box in that it is easy and intuitive to use. When the system boots, the EPG is the first image a user sees. The EPG displays all available virtual appliances from, for example, the following places: local USB, flash card, e.g. SD, xD, CF, CDROM/DVD, or other storage media; local hard disk storage; and the Internet, e.g. an appliance server. In the case of the embedded OS disclosed herein, the user selects an appliance to use from the EPG, whereupon the appliance is loaded and launched. If the selected appliance is not on a local storage, then it is downloaded, e.g. over the Internet from an appliance server. The downloaded appliance can be cached in local storage media such that, the next time it is needed, it need not be downloaded from the appliance server. The user can also elect to boot an operating system from the hard disk, if an operating system and hard disk are installed, or to power-off the system.

DETAILED DESCRIPTION OF THE INVENTION

Glossary

Figure 1:
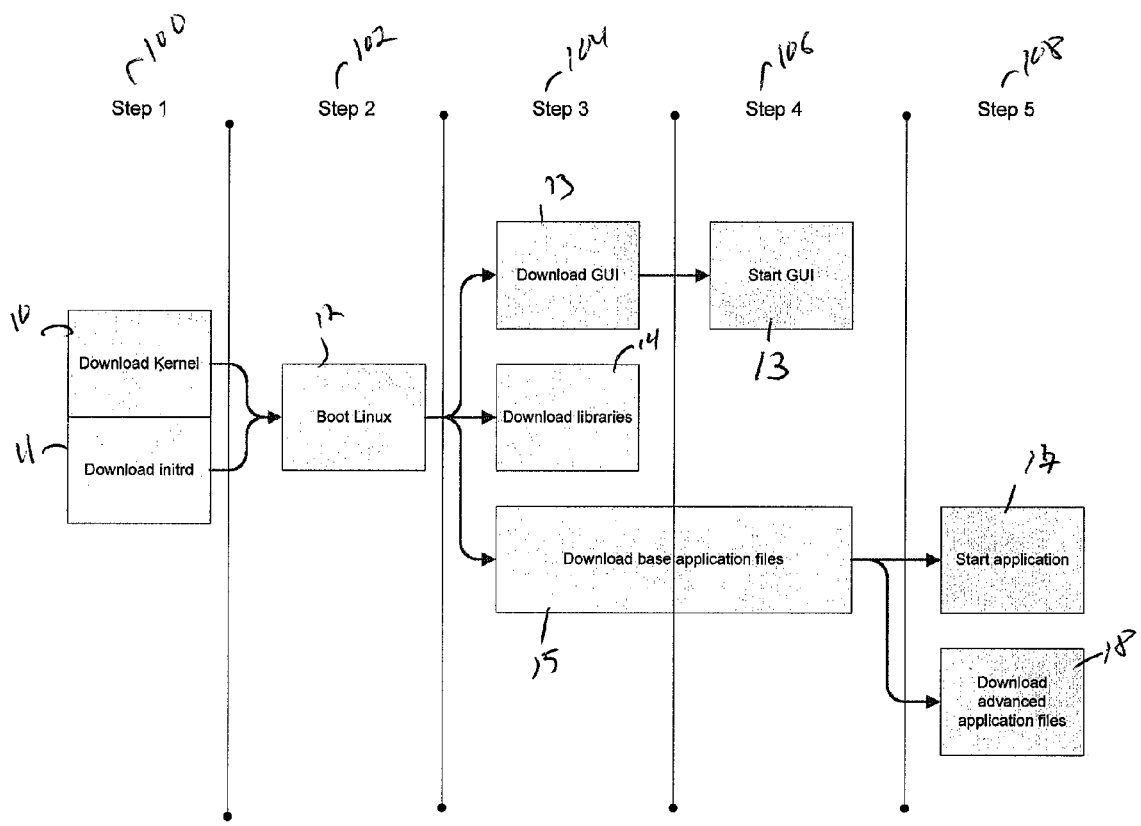
FIG. 1 is a flow diagram that shows the process flow how a virtual appliance can be piece-wise downloaded and executed to reduce user wait time according to the invention.

The following terms are used herein as defined below:
BIOS: Initial start up code on a personal computer
VA: Virtual appliance or application
ROM: Device on a personal computer motherboard that contains the BIOS
VoIP: Voice over IP
P2P: Peer-to-peer
EPG: Electronic program guide, i.e. a graphical user interface which displays a list of virtual appliances
NTFS: File system format used, for example, by Windows XP
MBR: Master Boot Record, the first, e.g. 63, sectors of a hard drive. The first sector contains the initial boot code and a partition table.

Discussion

One embodiment of the invention allows use of a personal computer in a manner similar to that of an appliance. By downloading and running a virtual appliance, the personal computer is given an appliance-like function and interface. It becomes a dedicated function device with a simple and easy-to-use user interface. This embodiment of the invention provides an appliance configuration for a personal computer that is able to, for example:

Download a television appliance to playback streamed video, movie, and TV content;

Download an audio player appliance to playback streamed audio content;

Download a CD/VCD/DVD player appliance to playback local audio/video content; and Download a wide variety of personal computing appliances for such applications as:
  VOIP, e.g. Skype, etc.
  Web browsing
  General office tasks, e.g. word processing, spreadsheet
  General productivity tasks, e.g. calendar, tasks
  Electronic communications, e.g. instant messaging, email, etc.
  General personal computer maintenance tasks, e.g. BIOS update, diagnostics, system backup and restore
  Complex computer service, e.g. remote complex diagnostics, connection to a support center, and technical support control of the system
  General product support tasks, e.g. updates, troubleshooting
  Electronic entertainment, e.g. online games
  Full-blown OS, such as Windows, wrapped in a virtualization layer so that the OS can run in parallel with the DVM embedded OS
  Allow use of instant-on environment while primary OS is booting in the background
  Enable primary OS to have dedicated access to hardware once it is fully booted and user switches to it.

Thus, this embodiment of the invention provides a true media, entertainment, and productivity center for the digital home. Accordingly, any personal computer that is preloaded with the inventive technology herein disclosed, e.g. in the boot ROM, is capable of functioning as an appliance, whether or not there is a hard disk or operating system installed.

Implementation/Instantiation

An electronic program guide (EPG) may be included in the system boot ROM. The EPG is similar to those provided with a set-top box in that it is easy and intuitive to use. In one embodiment, the EPG comprises a switching mechanism, such as a docking panel, application launch bar, scroll bar, soft keys, or physical buttons, that allows a user to establish a one-click personality for the EPG.

When the system boots or before a countdown expires and the user selects Instant On, the embedded OS is launched. It looks for all available virtual appliances from, for example, the following places, and displays them in the EPG:

Local USB, flash card, e.g. SD, xD, CF, CDROM/DVD, or other storage media
Local hard disk storage
Internet, e.g. an appliance server In an OS in a typical set-top box, the user selects TV or movie content to play. In the case of the EPG herein, the user selects an appliance to use, whereupon the appliance is loaded and launched. If the selected appliance is not on a local storage, then it is downloaded, e.g. over the Internet from an appliance server. The downloaded appliance can be cached in local storage media such that, the next time it is needed, it need not be downloaded from the appliance server. The user can also elect to boot an operating system from the hard disk, if an operating system and hard disk are installed, or to power-off the system.

What is an Appliance?

An appliance, or virtual appliance, is a self-contained binary package that contains everything that is necessary to perform a particular task. For example, a VOIP appliance contains all the software necessary for the user to connect to the Internet and then talk with another party. Such appliance may contain an operating system, network stack, device drivers, user interface, and a VOIP application.

Hardware Dependencies

This discussion addresses the need to support different hardware platforms. There are currently two solutions which are not mutually exclusive.

The first solution is to store the necessary device drivers in the boot ROM. For example, most typical motherboards include video, audio, and network devices. Device drivers for these devices can be stored in the boot ROM. When an appliance is launched and its underlying operating system needs device drivers, it loads these device drivers from the boot ROM.

The second solution is to run the appliances within a virtual machine. All virtual machines have the exact same virtual hardware and therefore all appliances are developed to use the same virtual hardware. However, the hypervisor, i.e. the virtual machine operating system, still needs to talk to the actual hardware. In this case, the hypervisor may resort to the first solution above, in which the device drivers are loaded from the boot ROM.

Personalized Experience

The EPG can include a personalizer. This allows the user to select his favorite appliances or otherwise improve ease of access to commonly used appliances. For example, the most commonly used appliances appear on the first screen or at the top of a list of available appliances. This avoids unnecessary user navigation to launch these appliances. The personalizer can also intelligently suggest appliances to the user. This is similar to the Amazon.com system of proposing similar books or products.

To personalize the applications, configuration data are sent to the DVM server. The server uses the information to select only the VAs which are compatible with the user's system. Additionally, the servers uses the information to optimize the VA or, in the case of diagnostics, to setup the correct configuration.

In one embodiment, a plurality of personalities are also provided for multiple users of the personal computer. This allows for better isolation by running in software containers which are abstracted from the underlying platform. These containers have the effect of reducing cross-contamination of viruses/spam, conflicts between DLL's and other libraries among the various applications, drivers, and OS versions. Installation and uninstallation of personalities are made much cleaner (reduced to file copy/delete operations).

The user's experience of using personalities can be further enhanced by making the same experience available wherever the consumer has access to a PC. Providing personalities in containers with virtualization technologies facilitates putting containers onto mobile devices, such as USB drives, then opening up the containers on any PC that has a USB port and the appropriate virtualization support. For example, the system may include a personality primarily for downloading media content from online and playing those media content back for the user via various interfaces. The media content can be country or culture specific.

Another embodiment provides reserved slots and resources for replacement personalities. This embodiment automatically compiles user profiles and user interests. Based on the user's choice of personalities, a profile is established that can be applied towards recommendations of other value-add services to the consumers, e.g. additional personalities, content, products, etc. The system can automatically search, upload information and propose relevant personalities based on a user profile and usage. Rebates to consumers, subsidies to OEMs, revenue to an application provider service based upon use, e.g. volume-based, paid by content, service, or software providers, can also be incorporated into the system.

Another embodiment comprises profile-based configuration, personalities, and packages of personalities, i.e. pre-configured packages. In this embodiment, the recommended customization for a certain profile may be as simple as configuration of a set of favorites in a browser, one personality, e.g. a set of applications, or a group of personalities. User profiles can be based on demographics, interests, or data from other online companies/communities, such as, for example:

Demographics: age, gender, ethnic background, profession, e.g. student, housewife, etc.

Interest-based: user-specified or tied to other interest-based

Tie to Netflix, Google, A9, Amazon, Yahoo, MSN, myS-pace, del.icio.us, RSS/blog subscriptions Groups of personalities or single personalities Provide shopping personality based on user profile, data, or behavior. If a user chooses a personality bundle that includes a shopping personality, the shopping personality can be further customized based on profile to add value to the customer, e.g. link to Pottery Barn/Crate & Barrell instead of Home Depot/Lowe's Tools are also provided for user preferences, configurations, skins, and favorites, e.g. pre-configured and personalized based on profiles. Personalities for different profiles may have exact same set of applications, but just different settings, e.g. for favorites, skins, user preferences, and configurations. One example is a browser personality that has pre-configured links to different websites for a teenager vs. a college student profile. Tools can facilitate creation of settings files and deployment of different settings to personalities.

The invention also contemplates a driver and peripheral integration kit. Some personalities may be bundled with a peripheral, e.g. a Bluetooth headset bundled with a VoIP personality. The driver and peripheral integration kit provides necessary tools to enable a peripheral and a device driver to work properly and optimally inside a virtual machine. The tools may service a virtual machine to coordinate properly amongst a plurality of virtual machines, e.g. only make the joystick available to a gaming personality, not to a productivity personality.

Multi-Layer EPG

In the case of an extremely small amount of BIOS ROM capacity, an EPG is not included with the embedded OS. Or if storage space is not an issue, a single complete EPG can be used.

In general, the boot ROM has very little capacity. Therefore, a multi-stage EPG is used. If the system is offline, the initial EPG can interface and display all of the available VAs that are stored on the system. Otherwise, for a system online, after launching the initial EPG, the embedded OS retrieves a second level EPG with more options and better graphics.

To create a better Instant On appearance with a multi-layer EPG, once the initial EPG is online and has reached the appliance server, it can download a more complete EPG. However, the look and feel of the EPG might not change during this process. Therefore, the user does not notice that the EPG has been upgraded.

Virtual Appliance Downloading

Introduction

The EPG presents a list of available virtual appliances (VA) to the user. The user selects a virtual appliance to use. If the VA is pre-cached in local storage, e.g. hard disk or USB flash drive, it is loaded into memory and executed. Otherwise, the VA is downloaded from an appliance server (DAS).

Optimizations

One approach to shortening startup time is to partition the virtual machine and its applications into blocks which can be loaded piecemeal. Initially only the needed blocks get loaded from hard drive, rather than the entire virtual machine and application code.

Driver optimizations may also be employed for specific personality requirements. For example, one embodiment contemplates driver reuse, e.g. wrappers for existing drivers. Specific personalities may need higher I/O throughput than available via standard virtualized I/O means. One example is a gaming personality, which needs higher I/O throughput to/from a graphics chip. The gaming personality can use a special graphics driver, instead of the generic virtual graphics driver, that allows direct or prioritized access to the I/O subsystem and graphics chip.

Another optimization reduces disk space requirements of each personality by sharing core code. For example, personalities using the same guest OS may contain only the additional applications and drivers beyond the common guest OS. Only one copy of the guest OS is stored as read-only and shared by multiple personalities.

Optimized OS images, e.g. having no memory management, single-tasking, no POST, etc, may also be employed.

This embodiment strips down a guest OS to contain only the services needed for the personality's applications to work. This makes the personality smaller and faster. A personality development kit can contain tools to help personality developers generate or strip down an OS.

Network Optimization

Another challenge that confronted the inventors is the time needed to download a virtual appliance. Obviously, the user expects to be able to use a VA immediately. Download time is dependent on the network speed and the size of the VA. The following discussion addresses various download scenarios and optimizations. There are various embodiments that address network optimization:

A first approach is that the DVM appliance server (DAS) be local. For example, download is very slow if the user is in Taiwan and the DAS is in the USA. Therefore, the EPG is always redirected to a server that is local or in-country. The EPG accesses the main DAS which, in turn, looks at the IP address of the personal computer upon which the EPG is running and then determines the country or region of origin. All languages are supported on each local server. Thus, using the user/login information, the server displays the desired language regardless of the local server to which a user is redirected. A redirection packet containing the IP address of the in-country or local server is then sent to the EPG, which uses the information contained in the redirection packet to connect to the local server.

A second approach is to download the VA from more than one server.

Another approach is to use peer-to-peer (P2P) downloading. This assumes that downloaded VAs are cached locally, e.g. on a hard disk or USB flash drive. A popular VA is cached in many personal computers. Therefore, when an EPG on a given personal computer needs a particular VA, it can get the VA from all the personal computers that already have a cached copy of that VA. By grabbing different parts of the VA concurrently from different personal computers, the EPG can reduce download times. The EPG can also intelligently select the personal computers from which to download by looking at the number of hops to the personal computer, etc.

Additionally, while the initial EPG screen waits for input from the user, the embedded OS pre-fetches and preloads VAs into RAM. Therefore, after the user makes a selection, the data should be already in RAM and launch instantly.

Virtual Appliance Downloading

Concurrency

In the most basic scenario, the VA is downloaded. Then it is decompressed and executed.

One optimization approach involves improving concurrency by performing the operations of decompressing and executing while the VA is being downloaded. To do this, a compression algorithm optimized for streaming media is used. At the top level, the VA is streamed to the personal computer. The stream is made up of compressed chunks. Each chunk can be decompressed independently of the other chunks. This approach works well with the P2P approach discussed previously because each chunk can come from a different peer personal computer.

Modularization

The concurrency approach can be further enhanced by making sure that the VA is highly modularized, such that each module can be downloaded, decompressed, and executed/initialized independently of the other modules. For example, if a VA is made up of an operating system plus an application, then the operating system (OS) can be one module and the application can be the other module. An intelligent download mechanism ensures that the OS module is downloaded, decompressed, and executed first. The application module can be downloaded and decompressed at the same time, but it is executed later. A more complex example involves a Web Browser VA, comprising an operating system, the GUI, a basic HTML Web browser, a Javascript engine, a Macromedia Flash player plus the fonts. Each of these elements can constitute a separate module. To improve the user experience, the OS, GUI, and basic browser have higher download priority. In this way, the user very quickly sees the Web browser and user interface. The other modules are downloaded at a lower priority or perhaps not downloaded at all, e.g. if the user never goes on a Web site that requires Macromedia Flash. The fonts can be in separate modules that are downloaded only when needed, e.g. if the user only needs Simplified Chinese fonts, then the Traditional Chinese fonts are not downloaded.

Linux Optimizations

This section is a discussion on optimizations if the OS in a VA is based on Linux.

Linux Modularization

A basic Linux-based download consists of a kernel file and a RAM disk image, such as intrd or initramfs. The application is contained within the RAM disk image. One problem with putting the entire application within the initrd file is that the latter then becomes very large, i.e. on the order of tens of megabytes. With a modular approach, the initrd file can contain just a basic RAM disk file system with some start-up scripts and utilities but nothing else. The application and any other necessary files, e.g. X-Windows, C libraries, utility programs, fonts, etc, are downloaded as separate modules. In this way, both the kernel and initrd files can be very small, e.g. less than 2 MB each, and therefore can be downloaded faster.

The download and execution process is preferably in the following order of priority:

Linux kernel and base initrd
The GUI is downloaded into the RAM disk file system
The base application is downloaded into the RAM disk file system FIG. 1 is a flow diagram that shows a download and execution process flow according to the invention. At Step 1 (100), a download kernel 10 and a download initrd 11 are started. At Step 2 (102), boot Linux 12 is started. Those skilled in the art will appreciate that the invention herein is applicable to operating systems other than Linux. At Step 3 (104), a download GUI 13, download libraries 14, and download base application files 15 are started. At Step 4 (106), the download base application files continue to be started and the GUI 13 is started. Finally, the init process is completed at Step 5 (108), when applications 17 are started and advanced application files 18 are downloaded.

Linux Download Manager

An intelligent Linux download manager is needed to implement the priority download and execution mechanism described previously. One reason for this is that the EPG only downloads the kernel and initrd files. Once Linux has started, it must download the rest of the modules. The download manager also must be able to:

Resume a previously interrupted download
Look for modules in local storage, e.g. cached modules, and load them directly from local storage instead of downloading them
Manage downloaded modules in local storage for easy identification and retrieve for later sessions Module Re-Use One advantage of modularizing and separating the various application modules is the ability to re-use the same modules for different VAs. For example, a Web browser VA needs the operating system kernel and GUI. A VoIP Virtual Appliance also needs an operating system and GUI. Both the Web browser and VoIP VAs can share some of the same modules. If the user has already used a Web browser VA, the operating system kernel, initrd, and GUI are already downloaded. Therefore, if the user then chooses to use a VoIP VA, only the VoIP application needs to be downloaded. This reduces start-up time and therefore improves the user experience.

Linux Device Drivers

The Linux kernel can contain a basic set of device drivers. However, drivers for hardware that is specific to a motherboard have to be separate from the kernel. This is to avoid two problems:

The need to have one kernel for every motherboard that needs to be supported
One large kernel that contains drivers for every motherboard that needs to be supported.

The kernel can obtain drivers from two sources. Firstly, the drivers can be downloaded by the embedded OS. Secondly, the drivers can be included in the boot ROM. At the very least, the network device driver must be downloaded by the embedded OS. The other drivers, e.g. specialty hard disk controller, audio, etc, can be downloaded by the operating system via the download manager. Once the drivers are downloaded, the Linux boot scripts use commands, such as insmod, to load the drivers into the kernel. However, because the drivers are loaded into a separate space, e.g. a RAM disk, by the embedded OS, some additional steps must be performed before the insmod command can work, e.g. mount the RAM disk. This slows down the boot up sequence. But then, when Linux has successfully loaded and the application has been launched, a background process can repackage the initrd and include the device drivers into the initrd file. This repackaged initrd is stored locally in the cache. The next time the user selects a Linux-based VA, the repackaged initrd is used. This initrd still results in a faster boot up time because the device drivers are already inside the file system. It is also possible to rebuild the Linux kernel to include the new device drivers.

Caching

There are several aspects involved in caching in the invention. A first aspect is the caching of files, modules, and VAs that the user wants to use. A second aspect is the pre-fetching and pre-caching of VAs that the user might want to use. For example, if we were to implement the following features:

Recommended VAs: Recommend VAs based on what the user has downloaded for use so far.
Suggested VAs: Suggests VAs based on what other similar users have downloaded.
Sponsored VAs.

By pre-fetching into RAM and pre-caching of VAs into local storage, we can guarantee a better user experience. Both pre-fetching and pre-caching can be done either by the embedded OS or within the VA.

Configurator

If we assume the existence of a cache for downloaded modules, then it is necessary to determine where the cache is. IN the presently preferred embodiment the cache is either:

In a special partition on the hard disk
In a file on the file system, e.g. file on NTFS
On a USB flash device
Other flash storage on the personal computer motherboard
Hard disk MBR, e.g. for the driver files If we want to put the cache on a partition on the hard disk, then there is a need to create this partition automatically and painlessly. This is why the EPG preferably includes a configurator function. For example, when the EPG first starts up and detects that all attached hard drives are empty, i.e. un-partitioned and/or unformatted, it asks the user if a cache partition should be created on the hard drive. If the user answers in the affirmative, then the EPG creates a small partition on the first hard drive.

Update/Maintenance/Security

The invention contemplates update, maintenance, and security features, for example:

Auto update of content, e.g. refresh of top 100 lists, etc:
Media-related personalities may contain content that can benefit from regular updates. For example, a karaoke personality may download every week new songs and MTVs. A movie personality may download new movies that match consumer's interests from Netflix.
Auto update of personality, e.g. patches, etc: Personalities may have feature improvements or bug fixes after their general release. The service VM can automatically update the existing personalities on consumer's PC, while keeping all consumer data and settings intact.
P2P/BitTorrent for content and personality updates: For downloading large content and patches to customers' PCs, this embodiment leverages P2P/Bit-torrent to improve download speed and reduce server infrastructure requirement. Content and updates can come piecemeal from other users. The updater can reside in a separate virtual machine so not to affect the personalities.

P2P/Bit-torrent for new and/or replacement personalities: As above, but for downloading new or replacement personalities. There may be a different front end to differentiate between maintenance and new features.

Central download manager, e.g. BitTorrent, etc, for media, new personalities, security updates, etc: For downloading large content and patches to customers' PCs, leverage P2P/Bit-torrent to improve download speed and reduce server infrastructure requirement. Content and updates can come piecemeal from other users. An updater can reside in a separate virtual machine so as not to affect the personalities.

Central virus scanning and recovery: Provides an open source solution or solution offered by, for example, Symantec/McAfee.

In on embodiment, a service virtual machine provides default security modules for anti-virus, spyware, firewall, etc, based upon open source. Users have the option to upgrade to activation-based commercial solutions provided by, for example, Symantec, McAfee, Trend Micro, etc.

System Memory Usage Model

Figure 2:
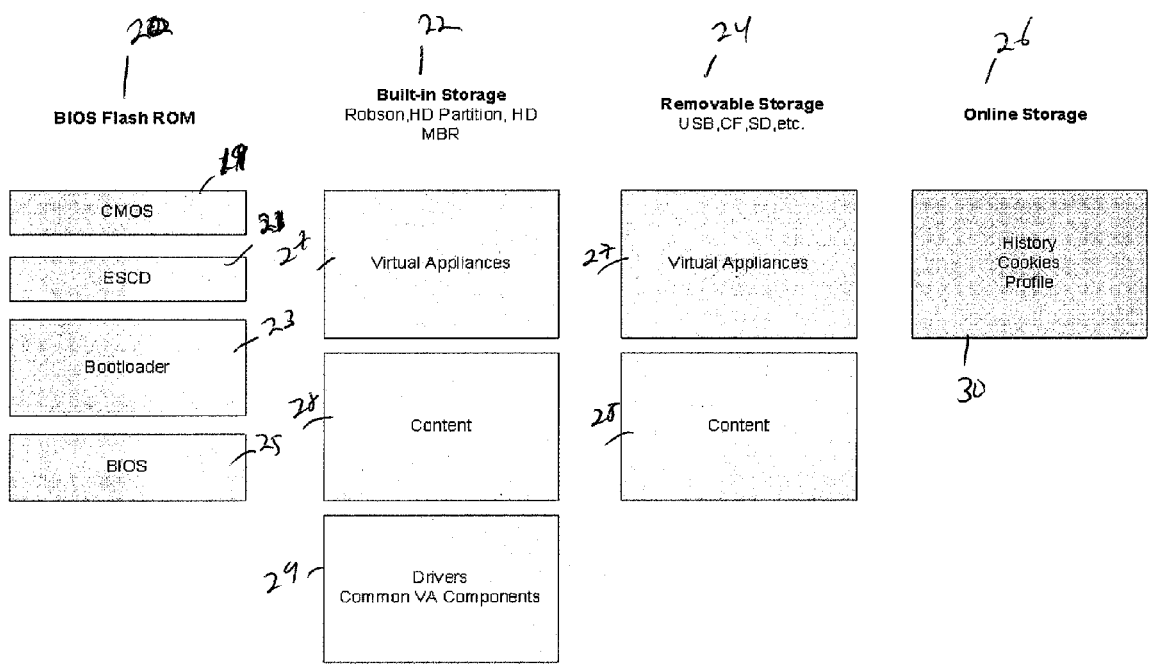
FIG. 2 is a block schematic diagram that shows a model for storing and caching pieces of data/applications according to the invention.

One embodiment makes use of the system non-volatile memory as efficiently as possible to improve the user experience through the instant-on experience. FIG. 2 is a block schematic diagram that shows a model for storing and caching pieces of data/applications according to the invention. In FIG. 2, a BIOS flash ROM 20 a CMOS area 19, contains an Extended System Configuration Data (ESCD) 21, boot loader 23, and the BIOS 25; built-in storage 22 contains one or more virtual appliances 27, content 28, and drivers and common virtual appliance components 29; removable storage 24 contains one or more virtual appliances 27, and content 28; and online storage 26 contains such information as user history, cookies, and profiles 30.

DVM Backend

Figure 3:
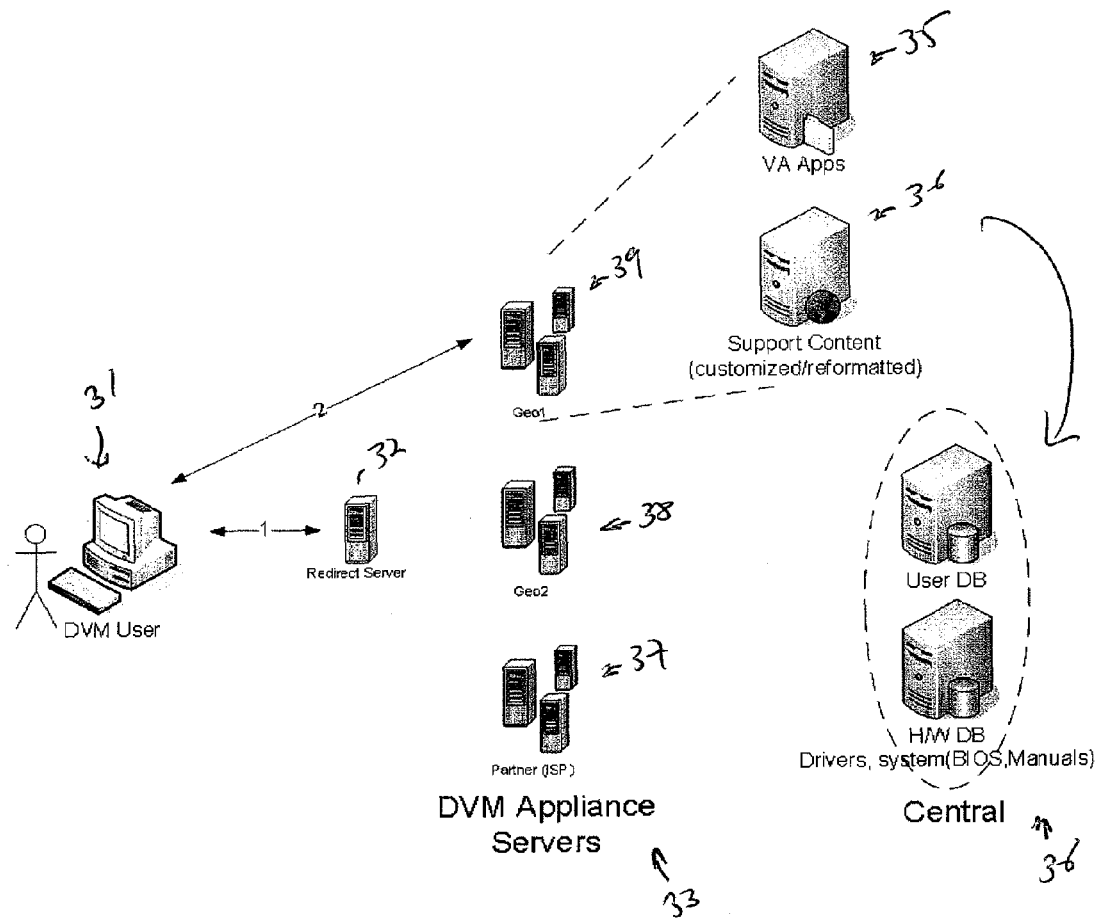
FIG. 3 is a block schematic diagram that shows a system server backend according to the invention.

FIG. 3 is a block schematic diagram that shows a system server backend according to the invention. In FIG. 3, a user at a personal computer 31 seeks access to the appliance servers 33. One aspect of enabling the instant-on experience provided by the invention requires the right back-end model to support the necessary bandwidth and speeds. One embodiment has all DVM enabled boards initially access a single server cluster first. This server is essentially a redirect server 32 which handles authentication and anti-phishing security protocols. After which, the redirect server redirects the DVM user to a local server cluster 38 to reduce delays through different geographical hops. Additionally, instead of a local cluster, the redirect server may redirect to a partners server 37 to supply partner specific applications.

At the local/partner server cluster, authentication is necessary. Another embodiment provides a method for passing on the authentication information from the redirect server or to have only the local/partner servers handle the authentication. These servers are setup to support high bandwidth transactions. Their main tasks are handling system information uploading, EPG applications downloading, VA application downloading, user login, and disconnection.

Each local/partner server cluster 37, 38, 39 contains some fileservers 35 and content servers 36. The fileservers contain all the VAs, while the content servers contain support data for updating BIOS, manuals specific to the BIOS and motherboard, etc. This content may be a reformatted version of the OEM support data from motherboard OEMs or could be the actual OEMs servers. This depends on the support model of supplying the OEMs with specifications so they can write their applications to meet these specs, or needing to supply them with a certain amount of source code to enable them. One embodiment maintains a reformatted version of the OEM servers to provide a standard user experience across all OEMs. Another option is to make the support model just a VA application.

The user and hardware (H/W) databases are more central, as opposed to the duplicate fileserver and content servers. The reason for this is for better consistency and security. The purpose of the user database is for storing information to make the user experience better. The database contains information, such as preferences/favorites, e.g. recently used VAs, etc, webtop configuration, desired language, etc.

Boot Loader

Figure 4:
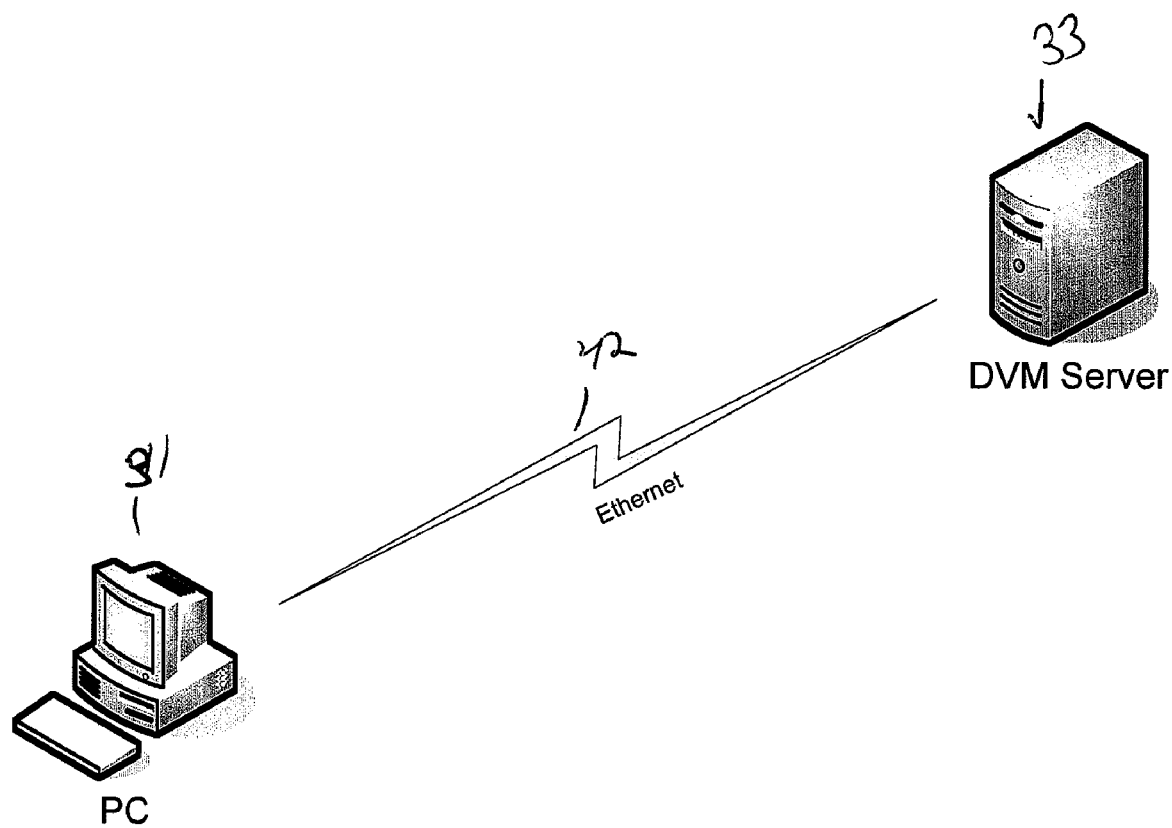
FIG. 4 is a block schematic diagram that shows a preferred system architecture according to the invention.

A personal computer with a VM boot loader comprises the end-user's personal computer 31. A second personal computer 33 acts as the DVM server. FIG. 4 is a block schematic diagram that shows a preferred system architecture according to the invention, in which network communication proceeds via an Ethernet connection 42. Those skilled in the art will appreciate that the invention encompasses other communications architectures as well.

The boot loader boots from a ROM/Flash disk. A network stack is included, and DHCP is preferably supported. A simple electronic program guide application is provided to display a list of VM applications that are available for download. The list of applications is fixed in this embodiment.

The EPG application allows the user several choices:
Select one of the VM applications to run
Boot to default OS on hard disk
Shut down the system, assuming APM/ACPI is supported in the hardware
When the user selects one of the DVM applications, the EPG downloads the application and executes it.

VM Applications

BIOS Upgrade Utility

The system downloads the BIOS binary and the upgrade utility and writes them to an emulated floppy. It then runs the upgrade utility.

Diagnostics Utility

The system downloads diagnostics utility to an emulated floppy or emulated harddrive.

Boot Linux with Flash 9

This embodiment uses a linux boot loader to start up Linux.

VM Execution Environment

Introduction

This aspect of the invention creates a ROMable execution environment that allows the download and execution of very diverse applications on a personal computer. The assumptions are:
Network transfer speeds are fast enough that applications can be quickly downloaded from a server for local execution.
There is sufficient RAM for the applications to fit into while they are being downloaded.
Applications can run in RAM without having to page swap from disk.

VM Software Stack

Figure 5:
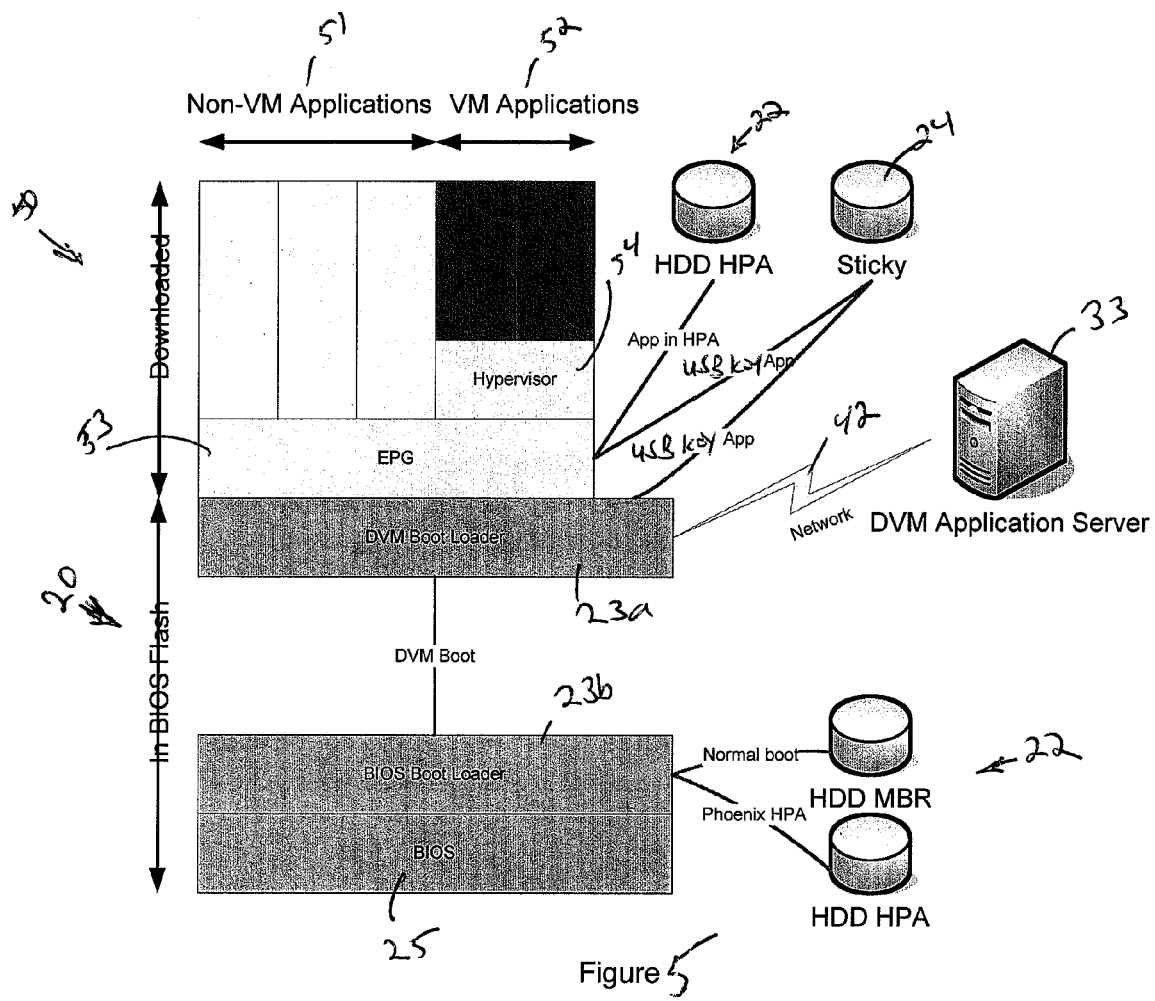
FIG. 5 is a block schematic diagram that shows a VM software stack and where the pieces of the stack reside according to the invention.

FIG. 5 is a block schematic diagram that shows a VM software stack at a user's computer 31 according to the invention. In FIG. 5, the software stack comprises a portion that is maintained in BIOS flash memory 20 and a portion that is downloaded 50. The stack is comprised of both non-VM applications 51 and VM applications 52. The traditional personal computer BIOS 25 and BIOS boot loader 23b remain somewhat unchanged:

By default, the BIOS boot loader 23b loads and executes the Master Boot Region (MBR) from the hard disk 22

If a HPA (hidden partition area) is present and is supported by the BIOS, the BIOS can execute the HPA content.

A second option for handing off control to the DVM boot loader is to incorporate the PXE protocols into the VM boot loader and replace the standard NIC option ROM (which contains PXE protocols) with DVM option ROM. This reduces the amount of BIOS customization and overall ROM space required.

A hotkey, timer, or other mechanism allows the BIOS boot loader to launch the VM boot loader 23a. The VM boot loader connects via Ethernet 42 to a VM application server 33 to download an EPG 53. The EPG is the first graphical user interface (GUI) a user encounters. The GUI displays choices of applications available, either local to the system or remote on the internet. The EPG is actually just another type of VM application. In one embodiment, the EPG is local in the flash BIOS, as opposed to a VA which is downloaded. However, for potential size constraints and scalability, the EPG may instead be composed of two levels of EPG. The basic EPG is stored in the flash BIOS and the enhanced version is downloaded as with other VAs. Although there is an enhanced version, this is transparent to the user in terms of look and feel. The user has more choices, either on the initial screen or hidden on the lower level menus. Display of either the basic or enhanced EPG is transparent to the user and is updated based on network connectivity.

After the EPG is invoked, the end user is then presented with a list of applications that are available. Applications include, for example, the following:

Non-virtual machine applications that can be downloaded from the VM application server 33.

Virtual machine applications that can be downloaded from the VM application server 33. These require the download of a hypervisor 54 or VM player.

DVM applications reside on a USB flash device 24 or hard disk HPA 22.

VM Boot Loader

Modules

Figure 6:
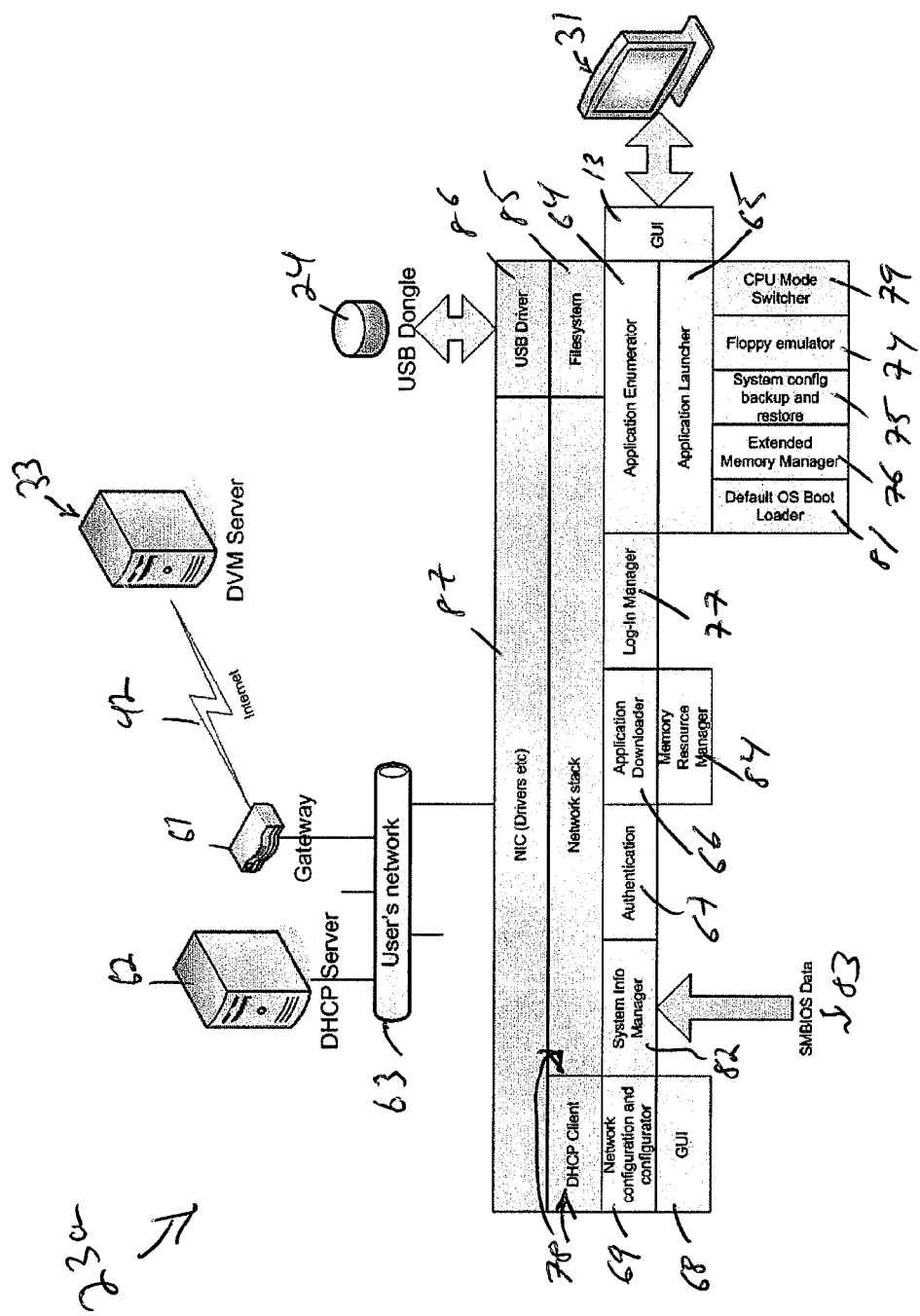
FIG. 6 is a block schematic diagram showing a VM boot loader and associated modules according to the invention.

FIG. 6 is a block schematic diagram showing a VM boot loader 23a and associated modules according to the invention. The VM boot loader resides in a user's personal computer 31 which is communicatively connected in this embodiment to a DHCP server 62 or a gateway 61 via the user's local area network 63. The user's personal computer comprises a GUI 13, file system 85, USB driver 86, and NIC derivers 87. An Internet connection 42 connects the user to the DVM server 33. The VM boot loader comprises, in this embodiment, the following modules:

Application Enumerator 64: Looks for available VM applications in a USB dongle or on the VM server. This is a more basic version of an EPG to fit in a small space. The full version of the EPG can also leverage the use of this module.

Application Launcher 65: Executes the application that has previously been loaded into memory. How this is done depends on the application's execution environment requirements.

Downloader 66: Downloads the application from the VM server to memory. How the application is laid out in memory depends on its execution environment requirements. The downloader also checks the integrity of the downloaded payload, e.g. via MD5, etc.

Authentication 67: Authenticates with the VM server.

Network Configuration GUI 68: Provides a user interface so that the end user can configure the VM boot loader to access the Internet.

Network Configuration Loader 69: Loads the network configuration.

Floppy emulator 74: Emulates a boot-from-floppy. The floppy image is in extended memory. The emulation is done by hooking INT40h and/or INT13h. This component is an image of a floppy 1.44M in extended memory for which protocols and hand shaking need to be developed to enable a boot from the memory section as if it were a floppy boot.

System configuration backup and restore 75: Saves the system configuration before anything runs and restores the system configuration after. These are primarily system devices, interrupt vectors, etc. This is used before and after the VM boot loader is run, before and after an application is run, etc. In other embodiments, the system configuration runs a restore function, then executes the application loader.

Device Driver Manager 76: This is where Linux device driver modules that are specific to the hardware platform are stored. If the application has a Linux OS, then it retrieves the device drivers from here and loads them into the kernel.

User Log-In Manager 77: Allows user to log into the VM server. This may then allow the use of a server-based persistent store.

GUI Library: Provides a standard look and feel.

Network/TCP/IP stack with DHCP 78.

CPU Mode Switcher 79: Switches x86 CPU from real to protected mode and back again.

OS Boot Loader 81: Boots the main OS from hard disk.

System Information Manager 82: Extracts system info, e.g. from SMBIOS 83, and transmits to the VM server.

Memory Resource Manager 84: Manages memory resources, e.g. extended memory, to allow downloading and layout of the applications in the appropriate locations.

Most of the foregoing modules can be reused by applications. For example, the EPG uses the downloader to download a selected application. It then use the application loader to launch the downloaded application.

Capability of a Preferred Embodiment

A preferred embodiment of the embedded OS has the following capability:

Network

NIC driver availability

Ease of development of NIC driver

TCP/IP Stack with DHCP

Proxy support

HDD

NTFS read/write

USB driver for USB flash drive or

INT13h access to USB flash drive

Access to file system on USB flash drive

FAT16

FAT32

HPA access

FAT32

Video

Text

Graphics
  Accelerated
Audio
  Not necessary
Input
  Mouse
  Keyboard
Memory access
  Access more than 1 MB for downloaded applications
Server interface functions
  Digital signature
  Authentication with server
Pre-boot and post-shutdown code insertion
  To backup interrupt vectors
  To restore interrupt vectors VM Application The VM application is a fully self-contained binary payload that is:
  Downloaded from the VM application server
  Loaded from a USB flash drive
  Loaded from a hard disk HPA Fully self-contained means that the application includes its own execution environment. For example, a Web browser application includes an operating system, the Web browser application, and any other supporting files or utilities.

Types of Applications

Applications can be classified according to:
  Whether they are VM applications
  The type of execution environment
  These classifications are not mutually exclusive.

VM Applications

Virtual machine applications require a hypervisor to run.

Execution Environment

There are several possible execution environments. The discussion herein only considers four of these, although the invention contemplates others:
  Real-mode with emulated disk
  Real-mode with fixed memory address
  Real-mode with emulated disk and large post-boot payload
  Real-mode with fixed memory address and large post-boot payload There is no need to consider a protected-mode environment because a real-mode to protected-mode switcher can fit into any of the four cases above.

Real-Mode with Emulated Disk

Figure 7:
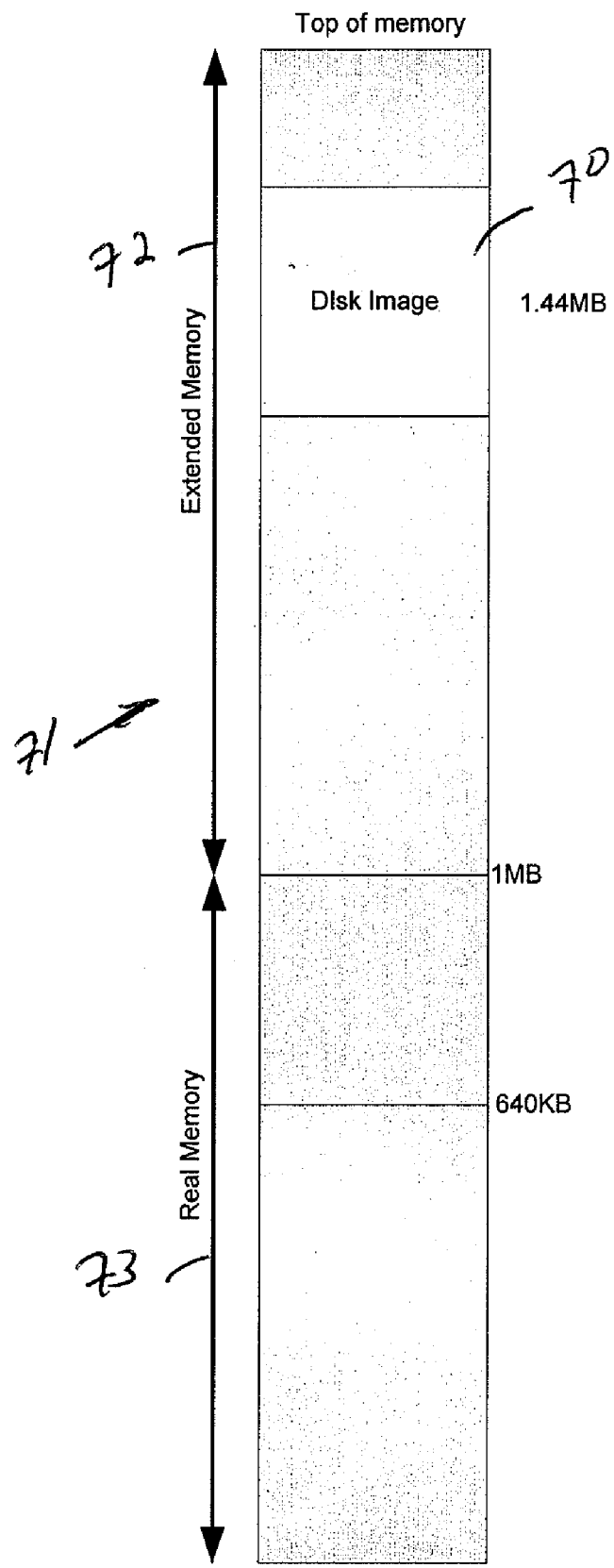
FIG. 7 is a schematic representation of a memory stack for real-mode operation with an emulated disk according to the invention.

FIG. 7 is a schematic representation of a memory stack 71 for real-mode operation with an emulated disk according to the invention. To handle this, we emulate the DOS boot process. The downloaded application payload 70 is stored in extended memory 72, as opposed to real memory 73, because of the size of a disk image, i.e. 1.44 MB or more. A floppy disk emulator is used to boot from the disk image. An example of this scenario is where the application runs on a version of DOS. The downloaded application payload is a floppy drive image that contains the application and the DOS file system.

Real-Mode with Fixed Memory Address

Figure 8:
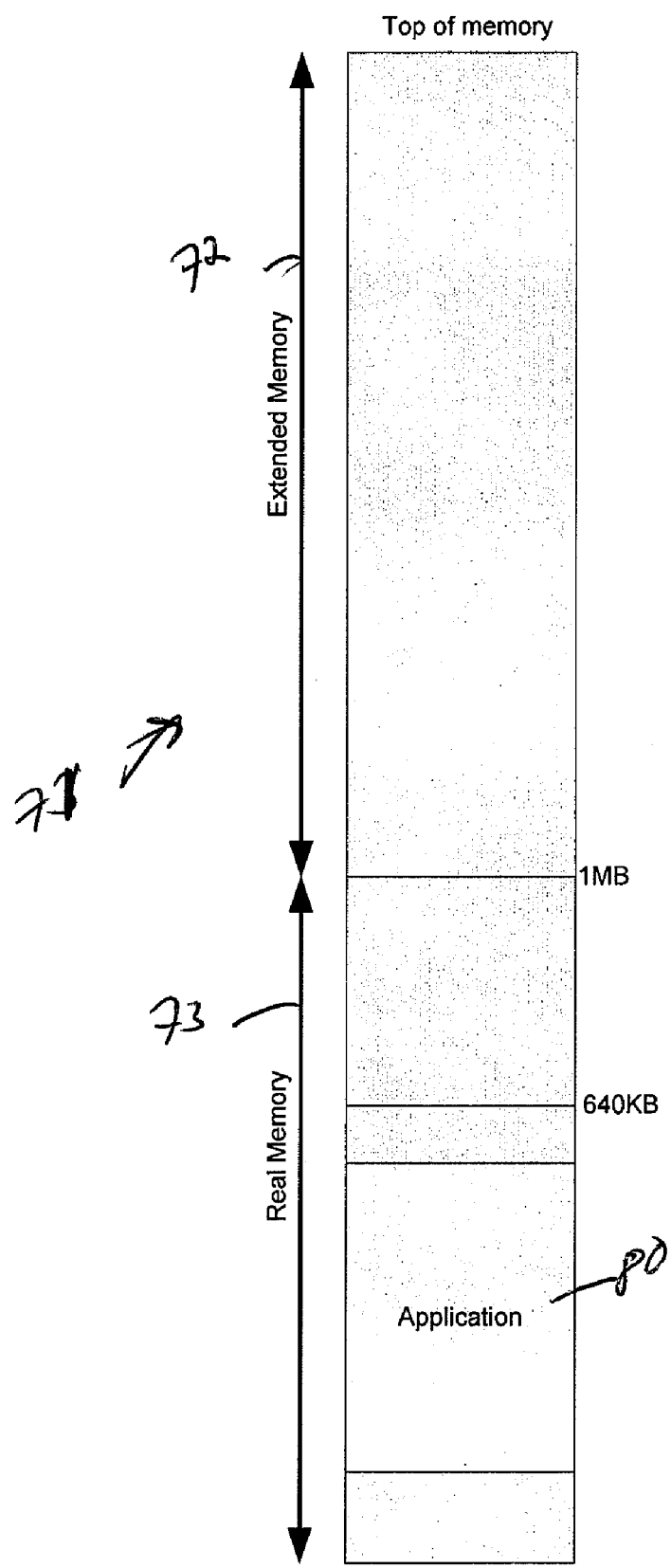
FIG. 8 is a schematic representation of a memory stack for real-mode operation with a fixed memory address according to the invention.

FIG. 8 is a schematic representation of a memory stack for real-mode operation with a fixed memory address according to the invention. This is the case where the downloaded application payload 80 is small enough to fit within the real-mode/DOS address space. The application is laid out in real memory at a fixed memory address that is specific to the application and is executed from that address.

Real-Mode with Emulated Disk and Large Post-Boot Payload

Figure 9:
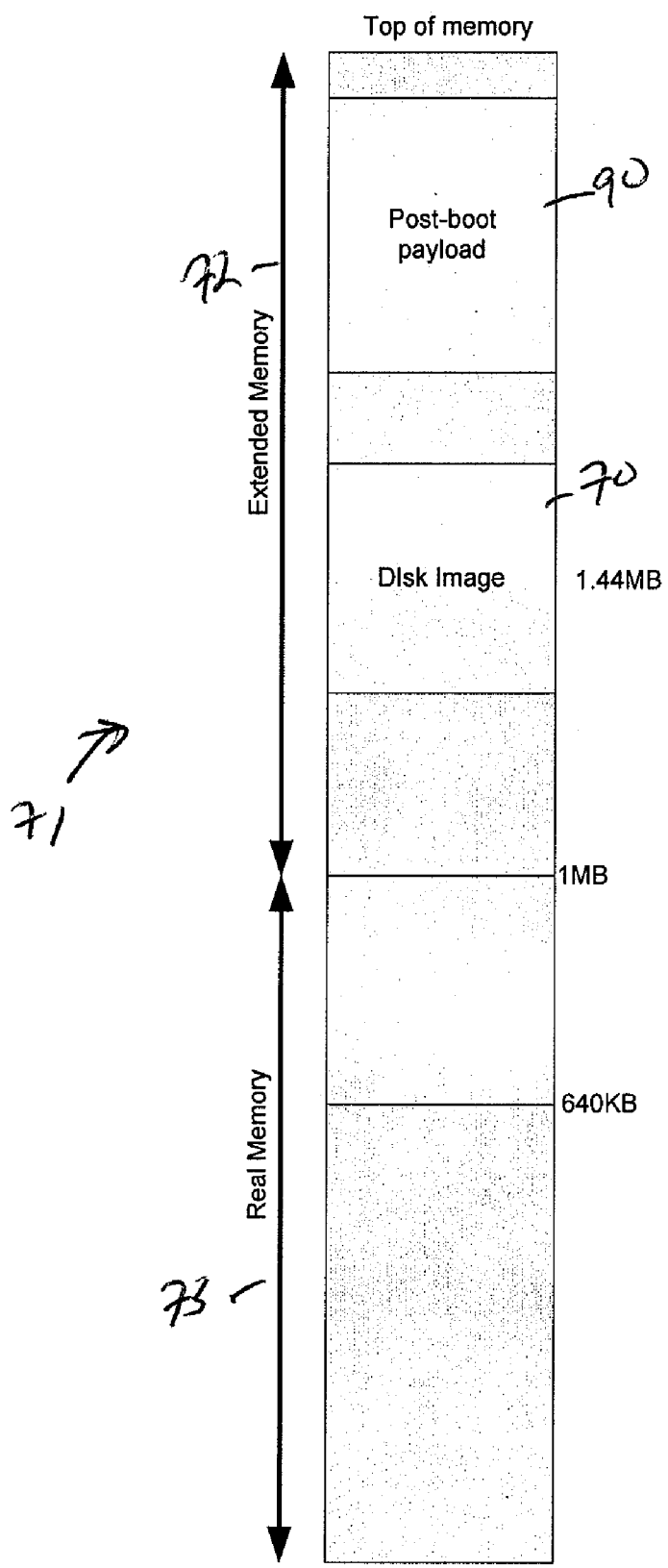
FIG. 9 is a schematic representation of a memory stack for real-mode operation with an emulated disk and a large post-boot payload according to the invention.

FIG. 9 is a schematic representation of a memory stack for real-mode operation with an emulated disk and a large post-boot payload according to the invention. This is a mode where we want to boot a large application. An example is booting a Linux-based application. The emulated disk contains something like SYSLINUX. The actual gzipped image 70 of the application and OS payload 90 is also loaded into extended memory.

Real-Mode with Fixed Memory Address and Large Post-Boot Payload

Figure 10:
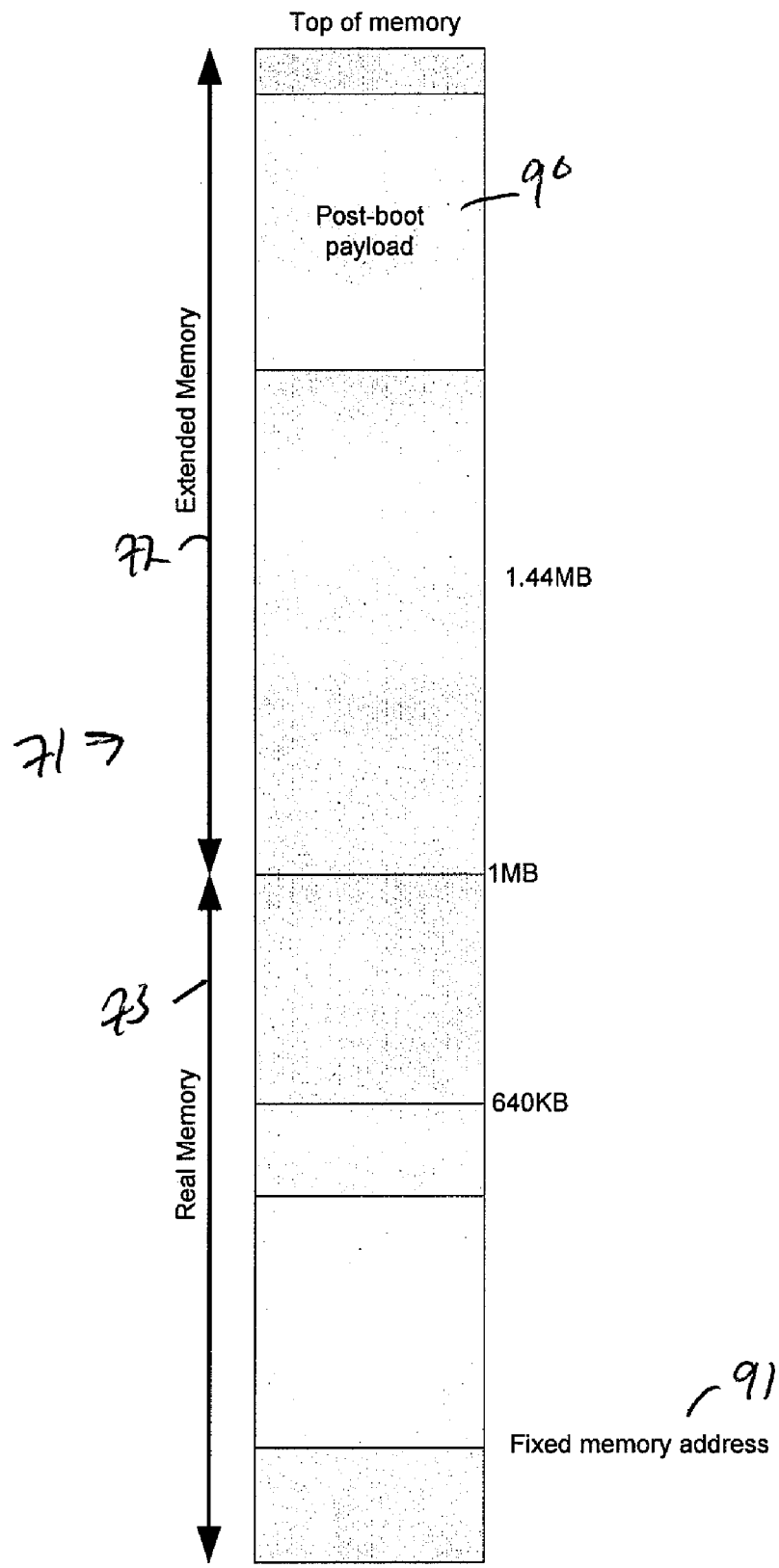
FIG. 10 is a schematic representation of a memory stack for real-mode operation with a fixed memory address and a large post-boot payload according to the invention.

FIG. 10 is a schematic representation of a memory stack for real-mode operation with a fixed memory address and a large post-boot payload 90 according to the invention. This is also a mode where we want to boot a large application. An example is booting a Linux-based application. Instead of using a floppy image of SYSLINUX, we have a custom utility that is loaded to a fixed real-mode memory location. The compressed image of the application and OS payload is loaded into extended memory. The real-mode utility decompresses the OS payload and loads/boot the Linux kernel.

Execution Environment Implications

The implications are as follows:
  The VM boot loader/application launcher must be able to identify each type of execution environment. This information, which is associated to each VM application, can be provided by the VM server.
  The VM boot loader must be able to access extended memory.
  Tools must be created to package the application payloads to fit one of these execution environments.

VM Application Requirements

The requirements are as follows:
  Must include its own execution environment, e.g. operating system
  Must be able to reside and execute entirely in RAM
  Must not need local persistent storage. Persistent storage may be provided over the network, e.g. on a server.

Operation Sequence after BIOS POST

Figure 11:
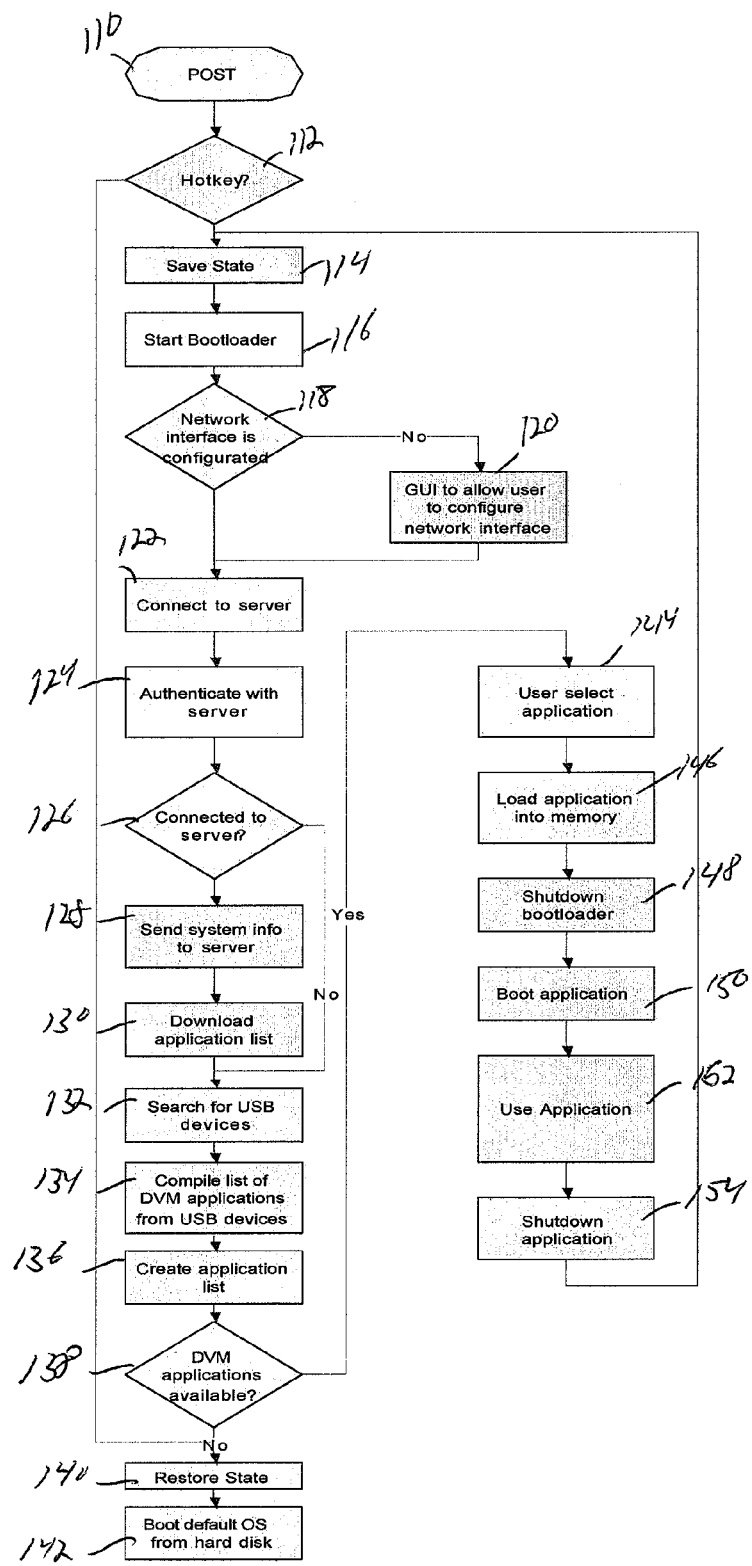
FIG. 11 is a flow diagram that shows the process after BIOS POST, including the hand-shaking between the client and server for downloading virtual appliances according to the invention.

FIG. 11 is a flow diagram that shows the process after BIOS POST (110) according to the invention. In FIG. 11, if a user selects a hot key (112), then the process proceeds by saving state (114). The boot loader is started (116) and a determination is made if the network is configured (118). If not, the GUI allows the users to configure the network interface (120); otherwise, the system connects to the server (122). The system authenticates with the server (124) and system confirms that a connection is established with the server (126). If a connection is detected, the system information is sent to the server (128) and an applications list is downloaded (130). If a connection is not established (126), then the system searches for USB devices (132); likewise, after the application list is downloaded (130), where a network connection is detected, the system searches for USB devices (132). A list of VM applications is compiled from the USB device (134) and an application list is created (136). If VM applications are available (138), the user may select an application (144). Responsive thereto, the system loads the application in system memory (146) and shuts down the boot loader (148). The application is then booted (150) and the user may use the application (152). When the application is shut down (154), state is saved (114). In the event that a hotkey is not pressed (112) after BIOS POST (110), state is restored (140) and the default OS is booted from the hard disk (142). Thus, if network connectivity is unsuccessful and if there are no VM applications available on any USB flash device, then the system boots the default OS on the hard disk drive.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for the virtualization of appliances, comprising the steps of:
    storing an embedded operating system (OS) in a system boot ROM of a personal computer, said personal computer having a default OS;
    immediately launching said embedded OS when said personal computer is booted, before launching said personal computer's default OS, and suspending launch of said personal computer's default OS at least in part;
    downloading a virtual appliance once said embedded OS is communicatively coupled to an appliance server, wherein a user interface of said embedded OS does not change during this process;
    upon launching said embedded OS, said embedded OS looking for available virtual appliances at any of a local storage medium and a network location, an appliance comprising a self-contained binary package that contains everything that is necessary to perform a particular task;
    said embedded OS displaying at said personal computer at least some of said available virtual appliances for selection;
    selecting from said user interface available virtual appliances at least one appliance to use at said personal computer; and
    downloading and launching said selected virtual appliance at said personal computer;
    wherein said virtual appliance includes its own execution environment, resides and executes entirely in RAM, and does not need local persistent storage.

2. The method of claim 1, further comprising the step of:
    downloading a selected appliance from an appliance server if said appliance is not on a local storage.

3. The method of claim 2, further comprising the step of:
    caching an appliance that is downloaded from said appliance server in a local storage medium;
    wherein the next time said appliance is needed, it need not be downloaded from said appliance server.

4. The method of claim 1, further comprising the steps of:
    electing to boot said personal computer's default OS from a local storage medium; and
    said personal computer booting said default OS.

5. The method of claim 1, further comprising the step of:
    providing a personalizer for selecting favorite appliances and/or accessing commonly used appliances, and for intelligently suggesting appliances to a user;
    wherein most commonly used appliances appear on a first screen or at the top of a list of available appliances.

6. The method of claim 1, further comprising any of the steps of:
    redirecting said embedded OS to a server that is local or in-country for appliance downloading;
    download an appliance from more than one server; and
    using peer-to-peer (P2P) appliance downloading.

7. The method of claim 1, further comprising the step of:
    decompressing and executing an appliance while said appliance is being downloaded.

8. The method of claim 1, further comprising the step of:
    modularizing at least one appliance, said appliance comprising a plurality of individual modules, wherein each module of said appliance is downloaded, decompressed, and executed/initialized independently of each of the other modules.

9. The method of claim 8, further comprising the step of:
    providing an intelligent download mechanism for ensuring that a module having a higher priority is downloaded, decompressed, and executed first.

10. The method of claim 8, further comprising the step of:
    re-using the same modules for different appliances.

11. The method of claim 1, further comprising any of the step of:
    caching of files, modules, and that a user wants to use; and
    pre-fetching appliances from local storage into RAM while waiting for user input at said embedded OS; and
    pre-caching appliances that a user might want to use from network into local storage.

12. The method of claim 11, wherein said cache is either in a special partition on a hard disk, in a file on a file system, on a USB flash device, on other flash storage on a personal computer motherboard, or on a hard disk MBR.

13. The method of claim 12, further comprising the step of:
    said embedded OS providing a configurator function which, when said embedded OS first starts up and detects that all attached hard drives are empty, asks a user if a cache partition should be created on the hard drive;
    wherein if said user answers in affirmatively, then said embedded OS creates a partition on a first hard drive.

14. An apparatus for the virtualization of appliances, comprising:
    a computer comprising a memory for storing a software stack, said software stack comprising a first portion that is maintained in a BIOS flash memory and a second portion that is downloaded to said memory, said stack comprising both non-virtual applications and virtual applications;
    an embedded operating system (OS) stored in a system boot ROM;
    a virtual appliance boot loader;
    a BIOS boot loader;
    means for using said BIOS boot loader to launch said virtual appliance boot loader;
    said appliance boot loader comprising means for connecting via a network to an appliance server to download said virtual appliance to said memory;
    said embedded OS further comprising means for presenting an end user with a list of applications that are available;
    wherein said applications comprise any of:
        non-virtual machine applications that can be downloaded from said appliance server;
        virtual machine applications that can be downloaded from said appliance server; and
        applications that reside on any of a USB flash device or hard disk drive associated with said computer; and
    a default OS stored on a hard disk of said personal computer, wherein said embedded OS is launched when said personal computer is booted, thereby suspending launch of said default OS, at least in part.

15. The apparatus of claim 14, said virtual appliance boot loader further comprising any of:
    an application enumerator for looking for available virtual machine applications;

an application launcher for executing applications that have previously been loaded into said memory;

a downloader for downloading applications from said appliance server to said memory;

authentication means for authenticating said computer with said appliance server;

a network configuration for providing a user interface to allow an end user to configure said virtual appliance boot loader for network access;

a network configuration loader for loading a network configuration;

a floppy emulator for emulating a boot-from-floppy;

a system configuration backup and restore module for saving a system configuration before anything runs and for restoring said system configuration thereafter;

a device driver manager for storing device driver modules that are specific to the computer;

a user log-in manager for allowing a user to log into said appliance server;

a GUI library for providing a standard user interface;

a network/TCP/IP stack with DHCP;

a CPU mode switcher for switching an x86 CPU from real to protected mode and back again;

an OS boot loader for booting a main operating system from a computer hard disk;

a system information manager for extracting system information from a BIOS and transmitting said extracted information to said appliance server; and a memory resource manager for managing memory resources to allow downloading and layout of applications in appropriate locations.

16. The apparatus of claim 14, said applications comprising any of:

virtual machine applications that require a hypervisor to run; and execution environments comprising any of:
real-mode with emulated disk;
real-mode with fixed memory address;
real-mode with emulated disk and large post-boot payload; and
real-mode with fixed memory address and large post-boot payload.

17. A computer implemented method for the virtualization of appliances, comprising the steps of:

storing an embedded operating system (OS) in a system boot ROM of a personal computer, said personal computer having a default OS;

immediately launching said embedded OS when said personal computer is booted, before launching said personal computer's default OS, and suspending launch of said personal computer's default OS at least in part;

downloading a virtual appliance once said embedded OS is communicatively coupled to an appliance server, wherein a user interface of said embedded OS does not change during this process;

providing a plurality of personalities for multiple users of said personal computer, each personality running in a software container which is abstracted from an underlying platform;

upon launching said embedded OS, said embedded OS accessing available virtual appliances and personalities at any of a local storage medium and a network location, an appliance comprising a self-contained binary package that contains everything that is necessary to perform a particular task;

said embedded OS displaying at said personal computer at least some of said available virtual appliances for selection;

selecting from said user interface available virtual appliances at least one appliance to use at said personal computer; and downloading and launching said selected virtual appliance at said personal computer;

wherein said virtual appliance includes its own execution environment, resides and executes entirely in RAM, and does not need local persistent storage.

18. The method of claim 17, further comprising the step of:
providing profile-based configuration, personalities, and packages of personalities.

19. The method of claim 17, further comprising any of the steps of:
auto updating content; and
auto updating personality.

20. The method of claim 19, further comprising the step of:
using P2P and/or BitTorrent for content and personality updates and/or for new and/or replacement personalities.

21. The method of claim 17, further comprising the step of:
providing a driver and peripheral integration kit for bundling personalities with a peripheral to provide necessary tools to enable a peripheral and a device driver to work properly and optimally inside a virtual machine.

* * * * *